United States Patent Office 3,376,141
Patented Apr. 2, 1968

3,376,141
PROCESS FOR PRESERVING BANANAS
Salvador V. Delgado and Carmen Delgado, both of 33755 Highway 74, Hemet, Calif. 92343
No Drawing. Filed Feb. 24, 1964, Ser. No. 347,049
4 Claims. (Cl. 99—154)

ABSTRACT OF THE DISCLOSURE

Bananas are preserved by completely peeling ripe ones, immersing the peeled bananas in salt water for a short period of time, then subjecting the bananas to a disinfectant, after which the natural color of the bananas is fixed by a conventionally known fixing agent. The bananas are then placed on a table in a hothouse or closed room and maintained at a temperature of from 80° to 100° F. for a period of about ten days during which the bananas are turned at least once.

---

This invention relates to a process of preserving bananas by using natural sunlight, and to a process for preserving bananas by means of artificial light.

It is well known that fresh ripe bananas are subject to easy and rapid spoilage, even in home refrigerators. Hitherto, other methods of preserving bananas had severe limitations of time and temperature, and hence such methods have had little commercial application. Further, such methods required special equipment and complicated procedures.

It is, therefore, an object of this invention to provide a process for preserving bananas which uses simple techniques and equipment.

Another object of this invention is to provide a process for preserving bananas which is effective for periods of time as long as up to 10 years and at temperatures normally found in the average American home.

A further object of this invention is to provide a process for preserving bananas which can be carried out under artificial light as well as natural sunlight.

These and other objects will be more readily understood by reference to the following description and claims.

Our process requires bananas selected at a certain stage of ripeness, which is generally indicated by the bananas, skin being a completely clear yellow throughout, and without brown spots. After the bananas have been selected, our invention provides two alternative preserving processes, one by natural sunlight, and the other by artificial light, and heat.

For the process using natural sunlight, the ripe bananas are completely peeled and placed in salt water for a period of time preferably about 3 minutes. The bananas are immersed completely in salt water during this treatment time.

Next, the treated bananas are placed in a chamber and subjected to the action of a disinfectant, preferably flowers of sulfur. After being treated with the disinfectant, the bananas are placed in a chamber in the presence of a conventionally known fixing agent to fix the natural color of the bananas.

After being treated to fix the natural color, the bananas are placed in a greenhouse with a white cloth covering the bananas. If the sun is bright enough to produce an average temperature of approximately 100° F. in the greenhouse during the day, the bananas are kept in the greenhouse for about 10 days and turned over only once. If the sunshine only produces a temperature in the greenhouse of 70 to 80° F., then the bananas are turned over from two or three times during the 10-day period.

The natural sunlight process is finished when the bananas turn an amber color but are still soft, though not as soft as at the beginning of the 10-day period. Also, at the end of the process, the bananas still contain moisture and are sweet to the taste.

Overexposure to natural sunlight under the foregoing conditions will result in a completely dry, dark brown product resembling leather, which is obviously inedible.

Our invention produces a successful result with the use of artificial light and heat of infra-red lamps as an alternative process. For this embodiment of our invention, the bananas are completely peeled and placed in salt water as before in the process using natural sunlight. Just as in the process using natural sunlight, the bananas are subjected to the action of a disinfectant and then the natural color of the bananas is fixed with a conventionally known fixing agent.

Then, the treated bananas are placed on a table in a closed room for five days. The temperature is kept at about 95° F. by infra-red lamps maintained approximately one foot distance over the bananas on the table. During the five day period, the bananas are turned over once.

As an example, we have found that for 4 bananas, two infra-red bulbs of 300 watts each maintained one foot away directly over the bananas adequately produces the required temperature of 95° F. for the prescribed five days with excellent results.

The resulting bananas, whether from natural sunlight or from infra-red light, are reduced to about one half their original volume and have a characteristic sweet taste. When packed in a moisture-proof cellophane or similar container, the treated bananas will keep up to ten years without refrigeration and at room temperatures normally found in American homes. If the treated bananas are placed in a moistureproof cellophane or similar package which is then kept in a refrigerator, then the treated bananas will last indefinitely. Without being placed in any container which is moistureproof, the treated banan as will last approximately 6 months at room temperature without spoiling.

Although we have described our invention with respect to two preferred embodiments, it is understood that the scope of the invention is not to be limited thereby, but numerous variations in conditions and procedures are possible without departing from the spirit and scope of the invention as claimed thereinafter.

We claim:
1. A process for preserving bananas comprising, peeling ripe bananas completely, placing the peeled bananas in salt water, subjecting the treated bananas to a disinfectant, fixing the natural color of the bananas, placing the resulting bananas covered with a white cloth in a greenhouse having a temperature of approximately 100° F. maintained by natural sunlight for a period of about ten days, and turning the bananas over once during said ten-day period.

2. A process for preserving bananas comprising, peeling ripe bananas completely, placing the peeled bananas in salt water, subjecting the treated bananas to a disinfectant, fixing the natural color of the bananas, placing the resulting bananas on a table in a closed room for about five days with a temperature of 95° F. maintained by infra-red lamps, and turning the bananas over once during said five-day period.

3. A process for preserving bananas comprising, peeling ripe bananas completely, immersing the peeled bananas completely in salt water for a period of 3 minutes, subjecting the treated bananas to a disinfectant, fixing the natural color of the bananas with a fixing agent, placing the resulting bananas covered with a white cloth in a greenhouse having a temperature of approximately 100°

F. maintained by natural sunlight for a period of about ten days, and turning the bananas over once during said ten-day period.

4. A process for preserving bananas comprising, peeling ripe bananas completely, immersing the peeled bananas completely in salt water for 3 minutes, subjecting the treated bananas to flowers of sulfur to disinfect them, fixing the natural color of the bananas with a fixing agent, placing the resulting bananas on a table in a closed room for five days with a temperature of about 95° F. maintained by infra-red lamps one foot away over the bananas, and turning the bananas over once during the said five-day period.

No references cited.

A. LOUIS MONACELL, *Primary Examiner.*

M. VOET, *Examiner.*